(12) United States Patent
Chevy et al.

(10) Patent No.: US 12,065,720 B2
(45) Date of Patent: Aug. 20, 2024

(54) METAL SHEET MADE OF HIGH-STRENGTH 2XXX ALLOY FOR AN AIRCRAFT FUSELAGE

(71) Applicant: CONSTELLIUM ISSOIRE, Issoire (FR)

(72) Inventors: Juliette Chevy, Moirans (FR); Jean-Christophe Ehrstrom, Grenoble (FR); Pablo Lorenzino, Saint Cassien (FR)

(73) Assignee: CONSTELLIUM ISSOIRE, Issoire (FR)

( * ) Notice: Subject to any disclaimer, the term of this patent is extended or adjusted under 35 U.S.C. 154(b) by 629 days.

(21) Appl. No.: 17/284,373

(22) PCT Filed: Oct. 7, 2019

(86) PCT No.: PCT/FR2019/052373
§ 371 (c)(1),
(2) Date: Apr. 9, 2021

(87) PCT Pub. No.: WO2020/074818
PCT Pub. Date: Apr. 16, 2020

(65) Prior Publication Data
US 2021/0388470 A1    Dec. 16, 2021

(30) Foreign Application Priority Data
Oct. 10, 2018 (FR) ........................... 1871158

(51) Int. Cl.
| | | |
|---|---|---|
| *C22C 21/16* | (2006.01) | |
| *B64C 1/00* | (2006.01) | |
| *C22C 1/02* | (2006.01) | |
| *C22C 21/18* | (2006.01) | |
| *C22F 1/05* | (2006.01) | |
| *C22F 1/057* | (2006.01) | |

(52) U.S. Cl.
CPC ............ *C22C 21/16* (2013.01); *B64C 1/00* (2013.01); *C22C 1/02* (2013.01); *C22C 21/18* (2013.01); *C22F 1/057* (2013.01); *B64C 2001/0081* (2013.01)

(58) Field of Classification Search
CPC .......... C22C 21/16; C22C 21/14; C22F 1/057
See application file for complete search history.

(56) References Cited

U.S. PATENT DOCUMENTS

| 7,229,508 B2 | 6/2007 | Cho et al. |
| 2006/0011272 A1 | 1/2006 | Lin et al. |
| 2013/0092294 A1* | 4/2013 | Eberl ............. C22F 1/057 |
| | | 148/552 |

FOREIGN PATENT DOCUMENTS

| EP | 1170394 A2 | 1/2002 |
| EP | 1776486 A2 | 4/2007 |

OTHER PUBLICATIONS

International Search Report for Application No. PCT/FR2019/052373 mailed Mar. 25, 2020.
N. A. Belov and N. N. Avksent'eva, "Quantitative Analysis of the Al-Cu—Mg—Mn Si Phase Diagram as Applied to Commercial Aluminum Alloys of Series 2xxx," Metal Science and Heat Treatment, (2013), vol. 55, No. 7: 358-363.
K. Y. Liu, et al., "Microstructure and mechanical properties of Al—Cu—Mg—Mn—Zr alloy with trace amounts Ag," Materials Science and Engineering, (2009), vol. 525, No. 1-2: 128-132.
A. A. Tiamiyu, et al., "Plastic deformation in relation to microstructure and texture evolution in AA 2017-T451 and AA 2624-T351 aluminum alloys under dynamic impact loading," Materials Science and Engineering, (2015), vol. 636, 379-388.
French Preliminary Search Report for Application No. FR 1871158 mailed Jul. 5, 2019.

* cited by examiner

*Primary Examiner* — Jessee R Roe
(74) *Attorney, Agent, or Firm* — McBee Moore & Vanik IP, LLC

(57) ABSTRACT

The invention relates to a thin metal sheet which is made of an alloy based on substantially recrystallized aluminum and which has a thickness of 0.25 to 12 mm, the alloy comprising, in percent by weight, Cu 3.4-4.0; Mg 0.5-0.8; Mn 0.1-0.7; Fe #0.15; Si #0.15; Zr #0.04; Ag #0.65; Zn #0.5; inevitable impurities #0.05 each and #0.15 in total, the remainder consisting of aluminum. The invention also relates to a process for manufacturing such a metal sheet and to the use thereof as a fuselage panel or sheet metal for the production of composite products such as fiber metal laminates (FML) for wing or fuselage applications in the aeronautical industry.

17 Claims, 1 Drawing Sheet

METAL SHEET MADE OF HIGH-STRENGTH 2XXX ALLOY FOR AN AIRCRAFT FUSELAGE

CROSS-REFERENCE TO RELATED APPLICATIONS

This application is the National Stage entry of International Application No. PCT/FR2019/052373, filed 7 Oct. 2019, which claims priority to French Application No. 1871158, filed 10 Oct. 2018.

BACKGROUND

Field

FIELD OF THE INVENTION

The invention relates to thin sheets made of 2XXX alloys, more particularly, such products, the processes for manufacturing and using them, particularly intended for aircraft and aerospace construction.

Description of Related Art

Increasingly high-performance rolled aluminum alloy products are developed to produce fuselage elements particularly intended for the aeronautical industry. Fuselage sheets are subjected to numerous forms of stress particularly depending on the operating phase (take-off, cruise, maneuver, landing, etc.) and the environmental conditions (temperature variations, adverse weather conditions, etc.). Furthermore, there is strong motivation to reduce both the weight and the costs of production.

T3 temper AA2024 or AA2524 alloys are alloys routinely used for the manufacture of fuselage sheets. Application EP1170394 A1 describes such alloys for the production of thin sheets for the aeronautical industry. These sheets are described to have an increased crack growth resistance. However, the compromise between mechanical strength/toughness thereof is not as high-performance as other alloys such as AA2139 alloy.

AA2139 alloy, particularly described by the U.S. Pat. No. 7,229,508, is indeed an absolutely high-performance alloy in terms of properties for fuselage sheets but has a relatively high density compared to the preceding solutions.

Recently, a novel alloy was proposed, AA2029 alloy, offering enhanced performances in the T8 temper, particularly in terms of compromise between conventional yield strength at 0.2% elongation $R_{p0.2}$ and toughness, compared to AA2024 and AA2524 alloys while having an equivalent density. Application EP1776486A1 discloses Al—Cu—Mg—Ag—Zr alloys corresponding to the composition of the AA2029 alloy. This alloy comprises in particular from 0.3 to 0.5% by weight of silver, which makes it an expensive alloy, the price whereof is dependent on the particularly variable price of silver. Moreover, although the performances of such an alloy are high, they can be enhanced further particularly in terms of toughness.

The aim of the invention of particularly that of remedying the problems mentioned above. In particular, there is a need for a 2XXX alloy having an enhanced compromise between mechanical strength/toughness compared to T3 AA2524 alloy while having equivalent crack growth resistance and density. This alloy must also have a good corrosion resistance, be compatible with cladding in order to enhance the protection against corrosion even further and offer an excellent compromise in respect of economic cost/technical performances. Finally, the alloy sheet sought must be capable of being produced according to conventional manufacturing processes particularly in terms of casting and rolling, by limiting or avoiding any non-conventional manufacturing step.

SUMMARY

The invention relates to a thin sheet made of an alloy based on mainly recrystallized to aluminum and which has a thickness between 0.25 and 12 mm comprising, as a % by weight, Cu 3.4-4.0; Mg 0.5-0.8; Mn 0.1-0.7; Fe≤0.15; Si≤0.15; Zr≤0.04; Ag≤0.65; Zn≤0.5; unavoidable impurities ≤0.05 each and ≤0.15 in total; remainder aluminum. In an embodiment, the thin sheet has a Cu content between 3.4 and 3.8% by weight.

Advantageously, the Mg content is between 0.55 and 0.75% by weight, preferably between 0.6 and 0.7% by weight.

According to a preferred embodiment, the Mn content is between 0.2 and 0.5% by weight, preferably between 0.25 and 0.45% by weight.

Advantageously, the Zr content is between 0.01 and 0.04% by weight or less than 0.01% by weight.

Preferably, the thin sheet is such that:
the Ag content is between 0.01 and 0.25% by weight and the Zn content is less than 0.1% by weight or
the Ag content is less than 0.2% by weight, preferably 0.05 and 0.2% by weight and the Zn content is between 0.2 or 0.4% by weight or—the Ag content is less than 0.1% by weight and the Zn content is less than 0.1% by weight, preferably the Ag content is between 0.02 and 0.1% by weight and the Zn content is less than 0.05% by weight, even more preferably, the Ag content is between 0.05 and 0.1% by weight and the Zn content is less than 0.05% by weight. According to a further embodiment compatible with the preceding embodiments, the Cu/Mg ratio is between 4.5 and 6.5, preferably this ratio is such that 5≤Cu/Mg≤6.

Preferably, the thin sheet has, in the T8 temper, at least two of the following properties, preferably at least three, more preferably all of the following properties:
UPE (T–L)>–0.00175 Rp0.2(LT)+0.93, preferably UPE (T–L)>–0.00175 Rp0.2(LT)+0.96 and, more preferably, UPE (T–L)>–0.00175 Rp0.2(LT)+0.99 where UPE (T–L) is in J/mm2 and Rp0.2(LT) in MPa;
UPE (T–L)>0.35 J/mm2, preferably UPE (T–L)>0.37 J/mm2;
crack growth rate da/dN less than or equal to 3.6 10-4 mm/cycle for a ΔK of 15 MPa√m;
density less than 2.800, preferably less than 2.780, preferably less than 2.775 and preferably less than 2.770 and more preferably less than 2.765.

The process for manufacturing a thin sheet which is made of an alloy based on mainly recrystallized aluminum which has a thickness of between 0.25 and 12 mm comprising successively the steps of:
a. producing a liquid metal bath comprising, as a percentage by weight, Cu 3.4-4.0; Mg 0.5-0.8; Mn 0.1-0.7; Fe≤0.15; Si≤0.15; Zr≤0.04; Ag≤0.65; Zn≤0.5; inevitable impurities ≤0.05 each and ≤0.15 in total; remainder aluminum;
b. casting a rolling ingot said liquid metal bath;
c. homogenizing said rolling ingot;

d. hot rolling and, optionally, cold rolling said rolling ingot into a sheet having a final thickness between 0.5 and 12 mm;

e. solution heat treatment and quenching of said sheet;

f. controlled stretching of said sheet with a permanent set of 0.5 to 6%;

g. aging the stretched sheet by heating at a temperature between 130 and 180° C. for a time of 10 to 100 h.

According to a preferred embodiment, the aging of the stretched sheet is carried out by heating at a temperature between 155 and 165° C. for a time of 28 to 60 h.

The invention also relates to the use of a sheet as described above or manufactured according to the process detailed above as a fuselage sheet or sheet for producing hybrid laminated aluminum-composite parts also known as the acronym FML (Fiber Metal Laminate) for wing or fuselage applications in the aeronautical industry.

Further subject matter and advantages of the invention will emerge on reading the following description of specific embodiments of the invention, given by way of non-limiting example.

DETAILED DESCRIPTION OF A PREFERRED EMBODIMENT

Figure 1:
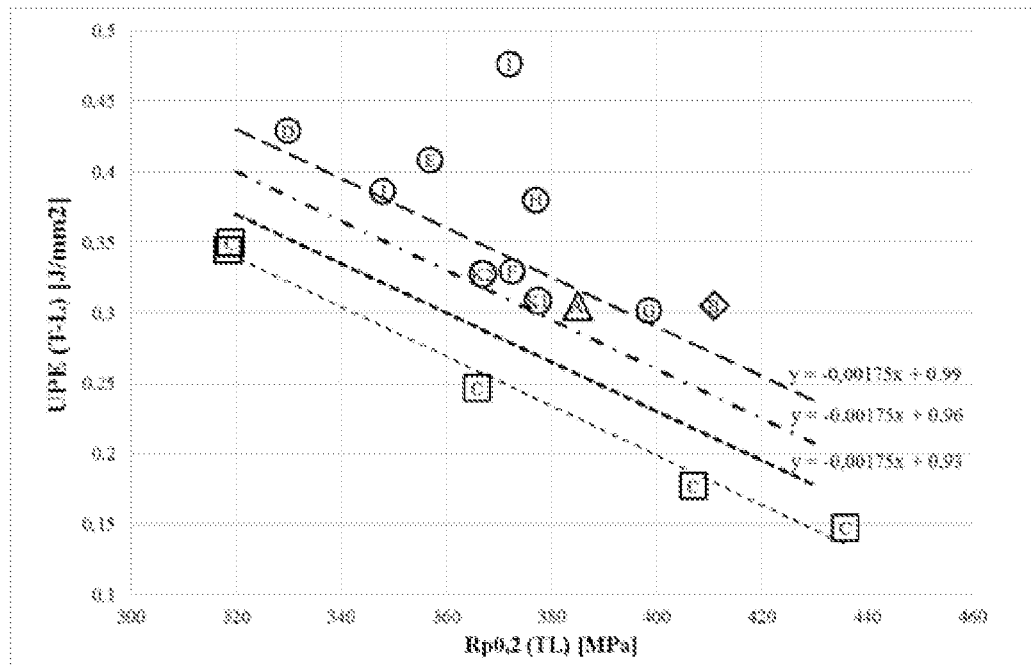
FIG. 1 illustrates the compromise between toughness (propagation energy UPE in the T-L direction in J/mm$^2$)-mechanical strength (conventional yield strength at 0.2% elongation $R_{p0.2}$ LT direction in MPa) of the different sheets in example 1.

Unless specified otherwise, all the indications concerning the chemical composition of the alloys are expressed as a percentage by weight based on the total weight of the alloy. The expression 1.4 Cu means that the copper content expressed as a % by weight is multiplied by 1.4. The alloys are designated in accordance with the Aluminum Association rules, known to a person skilled in the art. The density is dependent on the composition and is determined by computing rather than by a weight measurement method. The values are computed in accordance with the Aluminum Association procedure, which is described on page 2-12 and 2-13 of "Aluminum Standards and Data". Unless specified otherwise, the definitions of the tempers stated in the European standard EN 515 (1993) apply.

Unless specified otherwise, the tensile static mechanical characteristics, in other words, the ultimate tensile strength $R_m$, the conventional yield strength at 0.2% elongation $R_{p0.2}$, and the elongation at rupture A, are determined by a tensile test as per the standard ISO 6892-1:2009, the sampling and the direction of the test being defined by the standard ISO6361-1:2011.

The crack growth rate (da/dN) is determined as per the standard ASTM E 647-15. The test described in this standard makes it possible to determine a curve da/dN–ΔK where ΔK is the stress intensity factor variation applied and da/dN is the crack growth rate.

The toughness was evaluated using the Unit Propagation Energy (UPE, also known as "Kahn toughness") of a tear strength test as per the standard ASTM B871-01 (2013) in the T-L direction. It is expressed in J/mm$^2$.

Within the scope of the invention, the granular structure of the samples is characterized in the LxST plane at mid-thickness, t/2 and is evaluated quantitatively after anodic oxidation type metallographic etching in polarized light. The term "mainly recrystallized" is used when the granular structure has a predominant proportion of recrystallized grains, typically when more than 80%, preferably more than 90% and even more preferably more than 95% of the grains are recrystallized.

Preferably, the recrystallized grains are isotropic and have an aspect ratio, i.e., a ratio between the mean length and the mean thickness less than or equal to 6, preferably less than or equal to 5 and preferably less than or equal to 4. A low aspect ratio of the grains in the LxST plane particularly makes it possible to enhance the toughness of the products.

According to the present invention, a selected class of aluminum alloy containing specific and critical quantities of copper, magnesium, manganese in particular makes it possible to prepare thin sheets having an enhanced compromise of properties in particular compared to thin sheets made of T3 temper 2524 alloy. Thus, the invention relates to a thin sheet made of aluminum-based alloy. The term "thin sheet" denotes here a rolled product which has a thickness between 0.25 and 12 mm, preferably between 0.3 and 8 mm, even more preferably between 0.5 and 5 mm.

The aluminum-based alloy from which the thin sheet is produced comprises, as a % by weight, Cu 3.4-4.0; Mg 0.5-0.8; Mn 0.1-0.7; Fe≤0.15; Si≤0.15; Zr≤0.04; Ag≤0.65; Zn≤0.5; unavoidable impurities ≤0.05 each and ≤0.15 in total; remainder aluminum.

The Cu content is between 3.4 and 4.0% by weight, preferably between 3.4 and 3.8% by weight. Such a copper content particularly makes it possible to obtain an alloy having a good mechanical strength. However, the copper content in the alloy is increased to the detriment of the density.

The Mg content is between 0.5 and 0.8% by weight, preferably between 0.55 and 0.75% by weight and, more preferably, between 0.6 and 0.7% by weight. Adding Mg to the alloy is favorable for obtaining products having good mechanical characteristics and a low density. However, beyond 0.8% by weight, magnesium is liable to degrade the toughness.

The Cu/Mg ratio is advantageously between 4.25 and 8, preferably between 4.5 and 6.5, more preferably, this ratio is such that 5≤Cu/Mg≤6. In an advantageous embodiment, the Cu/Mg ratio is such that 5≤Cu/Mg≤5.5, preferably 5≤Cu/Mg≤5.3. In a further embodiment, the Cu/Mg ratio is such that 5.5≤Cu/Mg≤6, preferably 5.7≤Cu/Mg≤5.9. A Cu/Mg ratio greater than 8 is not favorable for sheet density. A Cu/Mg ratio less than 4.25 can result in obtaining a product not having a sufficient toughness for some of the targeted applications.

The Mn content of the alloy is between 0.1 and 0.7% by weight, preferably between 0.2 and 0.5% by weight, and more preferably, between 0.25 and 0.45% by weight. Mn is a grain refiner. It has however been observed that an Mn content greater than 0.7% by weight can be harmful for the sheet crack growth rate (da/dN).

The Zr content is less than or equal to 0.04% by weight, preferably less than or equal to 0.03% by weight. According to an advantageous embodiment, particularly making it possible to obtain an excellent compromise between Kahn toughness and yield strength $R_{p0.2}$, the Zr content is between 0.01 and 0.04% by weight. According to a further embodiment, the Zr content is less than 0.01% by weight. The present inventors particularly prefer sheets made of alloy comprising low levels of Zr in order to be able to recycle the sheets or machining cuttings or scrap from processes for manufacturing such sheets or the aeronautical industries more easily. Furthermore, the selected Zr content makes it possible to maintain a mainly recrystallized granular structure regardless of the sheet manufacturing process used. The Ag content is less than or equal to 0.65% by weight, preferably less than 0.5% by weight and more preferably less than 0.4% by weight. The Zn content is less than or equal to 0.5% by weight.

According to an advantageous embodiment, the Ag content is between 0.01 and 0.25% by weight and the Zn content is less than 0.1% by weight. The sheets according to such an embodiment particularly have an excellent compromise between toughness (particularly Kahn toughness)—$R_{p0.2}$. Thus, the propagation energy UPE (T–L) of such sheets is advantageously greater than 0.32 J/mm² and preferably greater than 0.4 J/mm² whereas the yield strength $R_{p0.2}$ (LT) is greater than 350 MPa. Advantageously, such sheets furthermore have an ultimate tensile strength $R_m$ (LT) greater than 400 MPa.

According to a further embodiment, the Ag content is less than 0.2% by weight, preferably between 0.1 and 0.2% by weight, and the Zn content is between 0.2 or 0.4% by weight. The sheets according to such an embodiment have, besides in particular a good compromise between toughness (particularly Kahn toughness) and $R_{p0.2}$ (LT), high mechanical properties both in the L direction and in the LT direction. Advantageously, such sheets have a yield strength $R_{p0.2}$ (L) greater than 360 MPa and preferably greater than 395 MPa and an ultimate tensile strength $R_m$ (L) greater than 400 MPa and preferably greater than 435 MPa as well as a yield strength $R_{p0.2}$ (LT) greater than 340 MPa and preferably greater that 365 MPa and preferably greater than 375 MPa and an ultimate tensile strength $R_m$ (LT) greater than 390 MPa and preferably greater than 405 MPa and preferably greater than 425 MPa. Preferably, such sheets have a Kahn toughness such that the propagation energy UPE (T–L) of such sheets is greater than 0.25 J/mm² and preferably greater than 0.3 J/mm². This embodiment is of interest because with a small addition of Ag, it makes it possible to achieve a high yield strength and an advantageous compromise with the toughness, particularly UPE (T–L)>−0.00175 $R_{p0.2}$(LT)+ 0.96.

According to a further embodiment, the Ag content is less than 0.1% by weight and the Zn content is less than 0.1% by weight, preferably the Ag content is between 0.02 and 0.1% by weight and the Zn content is less than 0.05% by weight, even more preferably, the Ag content is between 0.05 and 0.1% by weight and the Zn content is less than 0.05% by weight. Such sheets have the advantage of a superior compromise of properties to that of T3 2524 alloy sheets while having an economic advantage. The inventors observed that the Zn content in the selected alloy influences the corrosion resistance. For example, a Zn content of about 0.3% by weight is beneficial for the corrosion resistance whereas a content of 0.6% or over lowers the corrosion resistance. Furthermore, the compromise between yield strength ($R_{p0.2}$)/toughness (UPE) can be improved in the presence of Zn but is degraded for a content of 0.6% by weight and over.

According to a further embodiment, the Ag content is less than 0.01% by weight and the Zn content is less than 0.01% by weight.

Iron and silicon generally affect the toughness properties. The Fe and Si contents should preferably be at most 0.15% by weight each, preferably less than 0.10% by weight each. All the other elements, particularly the unavoidable impurities and the additional elements such as Ti, are at most 0.05% by weight each and at most 0.15% by weight in total.

According to an embodiment, the thin sheets made of aluminum-based alloy are manufactured using a process successively comprising the steps of producing a liquid metal bath comprising the alloying elements detailed above, casting, homogenizing, hot rolling and, optionally, cold rolling, solution heat treatment and quenching, controlled stretching and aging.

According to an advantageous embodiment, the casting of a rolling ingot from the liquid metal bath is carried out by semi-continuous casting with a direct chill.

The rolling ingot is homogenized, preferably at a temperature between 480 and 560° C., more preferably between 520 and 540° C., for a time of 4 to 20 h, advantageously 10 to 14 h.

The homogenized rolling ingot is then hot-rolled and, optionally, cold-rolled into a sheet having a final thickness between 0.25 and 12 mm before the hot rolling, the rolling ingots are advantageously heated at a temperature of 420 to 480° C., preferably 440 to 460° C. for 10 to 20 h.

The sheets undergo a solution heat treatment, for example at a temperature between 490 and 560° C., preferably 520 and 540° C. for 20 min to 2 h, preferably 30 minutes to 1 h, and are then quenched.

The homogenized sheets are subjected to controlled stretching with a permanent set of 0.5 to 6%, preferably of 3 to 6%. Such cold working rates can also be obtained with cold rolling, flattening, forging or a combination of these methods and controlled stretching. Controlled stretching with a selected permanent set makes it possible in particular to increase the mechanical properties of the sheets according to the invention.

The sheets are finally subjected to artificial aging or aging at a temperature between 130 and 180° C. for a time of 10 to 100 h. According to an advantageous embodiment making it possible to obtain a product with particularly high mechanical properties, the aging of the stretched sheet is carried out by heating at a temperature between 155 and 165° C. for a time of 28 to 60 h. According to a further advantageous embodiment making it possible in particular to reduce the treatment time, the aging of the stretched sheet is carried out by heating at a temperature between 170 and 190° C. for a time of 10 to 20 h.

The sheets according to the invention have, in the T8 temper, i.e., following the aging, at least two of the following properties, even more preferably all of the following properties:

UPE (T–L)>−0.00175 $R_{p0.2}$(LT)+0.93, preferably UPE (T–L)>−0.00175 $R_{p0.2}$(LT)+0.96 and, even more preferably, UPE (T–L)>−0.00175 $R_{p0.2}$(LT)+0.99 where UPE (T–L) is in J/mm² and $R_{p0.2}$(LT) in MPa;

UPE (T–L)>0.3 J/mm², preferably >0.35 J/mm², preferably UPE (T–L)>0.37 J/mm²;

crack growth rate da/dN less than or equal to 3.6 $10^{-4}$ mm/cycle for a ΔK of 15 MPa√m, density less than 2.800, preferably less than 2.780, preferably less than 2.775 and preferably less than 2.770 and more preferably less than 2.765

$R_{p0.2}$(LT)>355 MPa, preferably >360 MPa, preferably >365 MPa.

The sheets according to the invention have, in the T8 temper, a superior compromise between toughness/mechanical strength, in particular compromise between propagation energy UPE (T–L) in J/mm²/conventional yield strength at 0.2% elongation $R_{p0.2}$ (LT) in MPa to that of the T3 temper AA2524 alloy.

The high mechanical characteristics of the alloys according to the invention make it possible to manufacture thin sheets particularly suitable for the aeronautical industry, particularly to be used as fuselage sheets or sheets for producing hybrid laminated aluminum-composite parts also known as the acronym FML (Fiber Metal Laminate) for wing or fuselage applications in the aeronautical industry. Moreover, the sheet according to the invention generally does not cause any particular problem during subsequent operations carried out on the sheet in the T8 temper.

The corrosion resistance of the sheet according to the invention is typically high.

These aspects, as well as others of the invention, are explained in more detail using the following illustrative and non-limiting examples.

EXAMPLES

Example 1

In this example, 2XXX alloy sheets were prepared.

11 rolling ingots, the composition of which is given in Table 1, were cast in the form of rolling ingots of 70 mm by 190 mm by 1000 mm

TABLE 1

Composition as a % by weight of the rolling ingots and corresponding density

| Alloy | Cu | Mg | Mn | Zr | Ag | Zn | Si | Fe | Ti | Density |
|---|---|---|---|---|---|---|---|---|---|---|
| A (AA2029) | 3.6 | 0.90 | 0.31 | 0.12 | 0.44 | — | <0.07 | <0.05 | 0.03 | 2.773 |
| B (AA2139) | 4.9 | 0.38 | 0.31 | <0.01 | 0.38 | — | <0.07 | <0.05 | 0.03 | 2.803 |
| C (AA2524) | 4.2 | 1.29 | 0.61 | — | — | — | <0.07 | <0.05 | 0.04 | 2.774 |
| D | 3.4 | 0.68 | 0.31 | <0.01 | 0.06 | — | <0.07 | <0.05 | 0.03 | 2.763 |
| E | 3.6 | 0.68 | 0.32 | <0.01 | 0.17 | — | <0.07 | <0.05 | 0.03 | 2.769 |
| F | 3.5 | 0.59 | 0.30 | <0.01 | 0.35 | — | <0.07 | <0.05 | 0.03 | 2.771 |
| G | 3.6 | 0.70 | 0.30 | <0.01 | 0.35 | — | <0.07 | <0.05 | 0.03 | 2.773 |
| H | 3.4 | 0.60 | 0.56 | 0.03 | 0.35 | — | <0.07 | <0.05 | 0.03 | 2.773 |
| I | 3.5 | 0.64 | 0.33 | <0.01 | 0.62 | — | <0.07 | <0.05 | 0.03 | 2.777 |
| J | 3.5 | 0.69 | 0.31 | <0.01 | 0.05 | 0.3 | <0.07 | <0.05 | 0.03 | 2.770 |
| K1 | 3.5 | 0.60 | 0.29 | <0.01 | 0.16 | 0.3 | <0.07 | <0.05 | 0.04 | 2.772 |
| K2 | 3.5 | 0.60 | 0.29 | <0.01 | 0.34 | 0.3 | <0.07 | <0.05 | 0.04 | 2.776 |

The rolling ingots were homogenized for 12 hours at 530° C. They were preheated for 12 to 18 h at 450° C. before being hot-rolled then cold-rolled to obtain thin sheets of a thickness of 3 mm. The sheets underwent a solution heat treatment for 45 minutes at 530° C. then stretched with a controlled deformation of 2 to 4%. They were subjected to artificial aging, the conditions of which are detailed in Table 2 below. Following the manufacturing process, sheets D to K all had a mainly recrystallized structure (recrystallization rate at T/2 greater than 90%). The aspect ratio in the L/ST plane was determined for examples A, B and C and was 9.3, 2.7 and 4.7, respectively.

The sheets were tested to determine the static mechanical properties thereof. The yield strength $R_{p0.2}$, the ultimate tensile strength $R_m$ and the elongation at rupture A, in the L direction and the LT direction, are shown in Table 2.

TABLE 2

Controlled stretching and aging conditions of the thin sheets associated with the mechanical properties

| | | Aging | | L direction | | | LT direction | | |
|---|---|---|---|---|---|---|---|---|---|
| Sheet | % tensile deformation | Time (h) | Temperature (° C.) | Rp0.2 (MPa) | Rm (MPa) | A (%) | Rp0.2 (MPa) | Rm (MPa) | A (%) |
| A | 2 | 14 | 175 | 399 | 438 | 13.1 | 385 | 437 | 11.7 |
| B | 2 | 14 | 175 | 430 | 472 | 12.8 | 411 | 464 | 12.4 |
| C | 2 | 0 | 175 | | | | 319 | 455 | 23 |
| | 2 | 3 | 175 | | | | 319 | 447 | 22 |
| | 2 | 6 | 175 | | | | 366 | 459 | 18 |
| | 2 | 9 | 175 | | | | 407 | 473 | 14 |
| | 2 | 12 | 175 | | | | 436 | 484 | 11 |
| D | 2 | 14 | 175 | | | | 330 | 381 | 12.3 |
| | 4 | 14 | 175 | | | | 349 | 394 | 12.2 |
| E | 2 | 14 | 175 | | | | 357 | 406 | 12.5 |

TABLE 2-continued

Controlled stretching and aging conditions of the thin sheets associated with the mechanical properties

| Sheet | % tensile deformation | Aging | | L direction | | | LT direction | | |
|---|---|---|---|---|---|---|---|---|---|
| | | Time (h) | Temperature (° C.) | Rp0.2 (MPa) | Rm (MPa) | A (%) | Rp0.2 (MPa) | Rm (MPa) | A (%) |
| F | 2 | 14 | 175 | 398 | 439 | 12.55 | 373 | 428 | 14.3 |
| | 2 | 25 | 160 | | | | 373 | 431 | 15.5 |
| | 2 | 30 | 160 | | | | 379 | 434 | 15.0 |
| | 2 | 50 | 160 | | | | 384 | 434 | 14.5 |
| G | 2 | 14 | 175 | 429 | 465 | 11.7 | 399 | 450 | 12.8 |
| H | 2 | 14 | 175 | 399 | 435 | 13.5 | 377 | 429 | 13.0 |
| I | 2 | 14 | 175 | | | | 372 | 420 | 13.4 |
| J | 2 | 14 | 175 | | | | 348 | 397 | 12.9 |
| K1 | 2 | 14 | 175 | 401 | 438 | 12.4 | 378 | 429 | 13.0 |
| K2 | 2 | 14 | 175 | 390 | 430 | 13.15 | 367 | 421 | 13.6 |

The toughness was evaluated using the so-called Kahn method as per the standard ASTM B871-01 (2013), the results are given in Table 3.

TABLE 3

Kahn test results

| Sheet | % tensile deformation | Aging | | Propagation energy UPE in the T-L direction (J/mm²) |
|---|---|---|---|---|
| | | Time (h) | Temperature (° C.) | |
| A | 2 | 14 | 175 | 0.305 |
| B | 2 | 14 | 175 | 0.305 |
| C | 2 | 0 | 175 | 0.344 |
| | 2 | 3 | 175 | 0.349 |
| | 2 | 6 | 175 | 0.246 |
| | 2 | 9 | 175 | 0.177 |
| | 2 | 12 | 175 | 0.147 |
| D | 2 | 14 | 175 | 0.429 |
| E | 2 | 14 | 175 | 0.408 |
| F | 2 | 14 | 175 | 0.329 |
| G | 2 | 14 | 175 | 0.301 |
| H | 2 | 14 | 175 | 0.380 |
| I | 2 | 14 | 175 | 0.476 |
| J | 2 | 14 | 175 | 0.386 |
| K1 | 2 | 14 | 175 | 0.308 |
| K2 | 2 | 14 | 175 | 0.327 |

FIG. 1 illustrates the compromise between toughness (propagation energy UPE in the T-L direction in J/mm2) and mechanical strength (conventional yield strength at 0.2% elongation $R_{p0.2}$ LT direction in MPa) of the different sheets. In particular, the compromises between toughness/mechanical strength of sheets D-K2 in the T8 temper (aging of 14 h at 175° C.) are compared to the compromises between toughness/mechanical strength of sheets A (AA2029) and B (AA2139) in the T8 temper and C (AA2524) subjected to aging kinetics (T3 temper: no aging or T8: aging of 3, 6, 9 and 12 h at 175° C.). The relationship between the propagation energy UPE and the toughness is direct, although the UPE values cannot be used to predict the results of the R curve of large samples due to the different test geometries.

The fatigue crack growth rates measured as per the standard ASTM E 647-15 are furnished in Table 4 for the T–L direction. All the sheets are in the T8 temper (aging conditions: 14 h at 175° C.) with the exception of sheet C which is in the T3 temper.

TABLE 4

Crack growth rate (mm/cycle) as a function of ΔK (MPa√m)

| | ΔK (MPa√m) | | |
|---|---|---|---|
| Sheet | 10 | 15 | 20 |
| A | 1.31E-04 | 3.65E-04 | 6.77E-04 |
| C | 1.27E-04 | 2.47E-04 | 4.78E-04 |
| D | 1.01E-04 | 3.52E-04 | 6.72E-04 |
| F | 1.11E-04 | 3.49E-04 | 6.69E-04 |
| G | 1.17E-04 | 3.58E-04 | 6.60E-04 |
| H | 1.27E-04 | 3.75E-04 | 7.15E-04 |
| I | 1.01E-04 | 3.52E-04 | 6.72E-04 |
| K1 | 1.11E-04 | 3.52E-04 | 6.96E-04 |
| K2 | 1.10E-04 | 3.56E-04 | 6.90E-04 |

Example 2

In this example, the influence of the aging (or artificial aging) conditions was studied on samples from the casting of alloy F (having the composition detailed in Table 1), transformed into 3 mm sheets according to the process conditions of example 1 apart from the aging.

The aging conditions are given in Table 5. The sheets were tested to determine the static mechanical properties thereof. The yield strength $R_{p0.2}$, the ultimate tensile strength $R_m$ and the elongation at rupture A, in the L direction and the LT direction, are shown in

TABLE 5

Aging conditions of the thin layers of alloy F associated with the mechanical properties

| Alloy | Aging | | L direction | | | LT direction | | |
|---|---|---|---|---|---|---|---|---|
| | Time (h) | Temperature (° C.) | $R_{p0.2}$ (MPa) | Rm (MPa) | A (%) | $R_{p0.2}$ (MPa) | Rm (MPa) | A (%) |
| F | 14 | 175 | 398 | 439 | 12.55 | 373 | 428 | 14.3 |
|   | 25 | 160 | | | | 373 | 431 | 15.5 |
|   | 30 | 160 | | | | 379 | 434 | 15.0 |
|   | 50 | 160 | | | | 384 | 434 | 14.5 |

Example 3

In this example, 2XXX alloy sheets were prepared on an industrial scale.

4 rolling ingots, the composition of which is given in Table 6, were cast in the form of rolling ingots of 310 mm by 2650 mm by 2900 mm

TABLE 6

Composition as a % by weight of the rolling ingots

| Alloy | Cu | Mg | Mn | Zr | Ag | Zn | Si | Fe | Ti |
|---|---|---|---|---|---|---|---|---|---|
| L | 3.6 | 0.63 | 0.32 | <0.01 | 0.25 | 0.05 | 0.02 | 0.04 | 0.05 |
| M | 3.7 | 0.62 | 0.32 | <0.01 | 0.15 | 0.29 | 0.03 | 0.03 | 0.05 |
| N | 3.7 | 0.61 | 0.32 | <0.01 | <0.01 | <0.01 | 0.02 | 0.03 | 0.05 |
| O | 3.6 | 0.65 | 0.29 | <0.01 | <0.01 | 0.27 | 0.02 | 0.03 | 0.05 |

The rolling ingots were homogenized for 20 hours at 525° C. They were preheated for 12 to 18 h at 460° C. before being hot-rolled to obtain thin sheets of a thickness of 4 mm. The sheets underwent a solution heat treatment for 30 minutes at 510° C. then stretched with a controlled deformation of 2 to 4%. They were subjected to artificial aging of 14 hours at 175° C. Sheets L to O all had a mainly recrystallized structure (recrystallization rate at T/2 greater than 90%). The grain sizes were measured at mid-thickness on L/ST sections as per the standard ASTM E112. The results are shown in Table 7.

TABLE 7

Grain size characterization

| | Grain size (µm) L/ST section | | |
|---|---|---|---|
| Sheet | Mean length | Mean thickness | Aspect ratio |
| L | 110 | 25 | 4.4 |
| M | 137 | 29 | 4.8 |
| N | 120 | 28 | 4.3 |
| O | 153 | 31 | 5.0 |

The sheets were tested to determine the static mechanical properties thereof. The yield strength $R_{p0.2}$, the ultimate tensile strength $R_m$ and the elongation at rupture A, in the L direction and the LT direction, are shown in Table 8.

TABLE 8

Mechanical properties of industrial sheets

| | LT direction | | |
|---|---|---|---|
| Sheet | Rp0.2 (MPa) | Rm (MPa) | A (%) |
| L | 369 | 418 | 13.8 |
| M | 367 | 413 | 13.1 |
| N | 354 | 402 | 12.6 |
| O | 349 | 398 | 13.2 |

Figure 2:
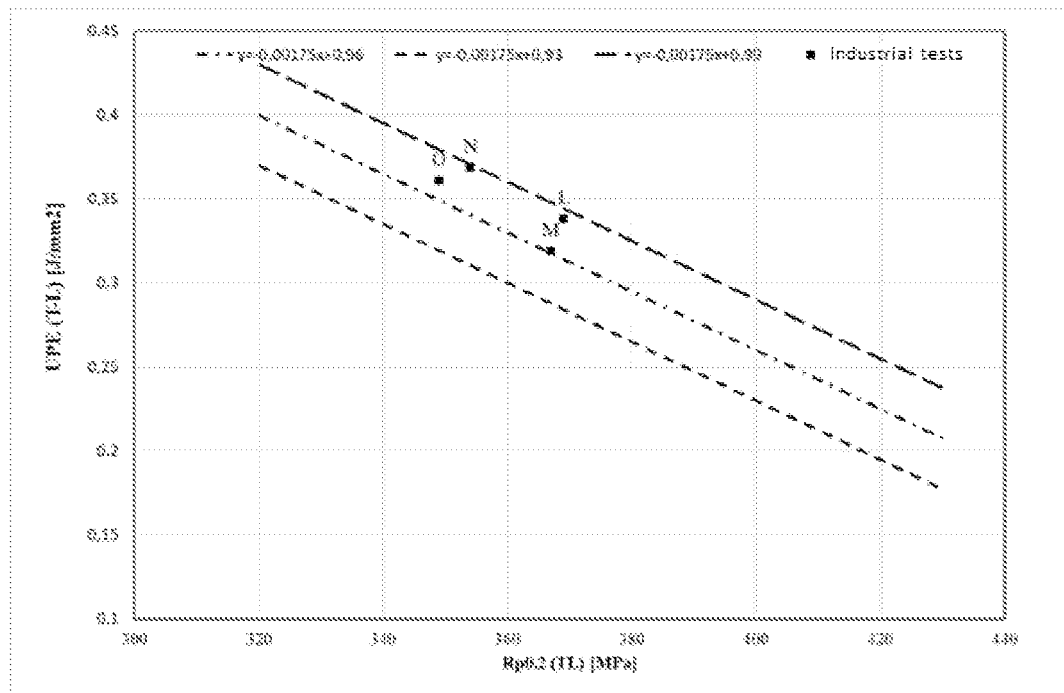
FIG. 2 illustrates the compromise between toughness (propagation energy UPE in the T-L direction in J/mm$^2$)-mechanical strength (conventional yield strength at 0.2% of elongation $R_{p0.2}$ LT direction in MPa) of the different sheets in example 3.

The toughness was evaluated using the so-called Kahn method as per the standard ASTM B871-01 (2013), the results are given in Table 9 and in FIG. 2.

TABLE 9

Kahn test results

| Sheet | Propagation energy UPE in the T-L direction (J/mm$^2$) |
|---|---|
| L | 0.338 |
| M | 0.319 |
| N | 0.369 |
| O | 0.361 |

The invention claimed is:

1. A thin sheet which is made of an alloy based on mainly recrystallized aluminum and which has a thickness between 0.25 and 12 mm comprising, as a % by weight,
   Cu 3.4-4.0;
   Mg 0.5-0.8;
   Mn 0.1-0.7;
   Fe≤0.15;
   Si≤ 0.15;
   Zr≤ 0.04;
   Ag 0.01-0.25;
   Zn<0.1;
   other elements ≤0.05 each and ≤0.15 in total;
   wherein the Cu/Mg ratio is between 5 to 5.5;
   remainder aluminum.

2. The thin sheet according to claim 1, wherein the Cu content is between 3.4 and 3.8% by weight.

3. The thin sheet according to claim 1, wherein the Mg content is between 0.55 and 0.75% by weight.

4. The thin sheet according to claim 1, wherein the Mn content is between 0.2 and 0.5% by weight.

5. The thin sheet according to claim 1, wherein the Zr content is between 0.01 and 0.04% by weight or less than 0.01% by weight.

6. The thin sheet according to claim 1, wherein:
the Ag content is less than 0.1% by weight and the Zn content is less than 0.1% by weight.

7. The thin sheet according to claim 1, wherein, in the T8 temper, said sheet comprises at least two of the following properties, optionally at least three, optionally all of the following properties:

UPE (T–L)>−0.00175 $R_{p0.2}$(LT)+0.93
where UPE (T–L) is in J/mm$^2$ and $R_{p0.2}$(LT) in MPa;
UPE (T–L) >0.3 J/mm$^2$;
crack growth rate da/dN less than or equal to 3.6 10$^{-4}$ mm/cycle for a ΔK of 15 MPa√m;
density less than 2.800
$R_{p0.2}$(LT) >355 MPa.

8. The thin sheet according to claim 1, wherein recrystallized grains have on an LxST section at mid-thickness an aspect ratio, optionally wherein, a ratio between the mean length and the mean thickness less than or equal to 6.

9. A product comprising a thin sheet according to claim 1 for use as a fuselage sheet.

10. The thin sheet according to claim 1, wherein the thickness is between 0.3 and 8 mm.

11. The thin sheet according to claim 1, wherein the thin sheet is manufactured using a process successively comprising:
a. producing a liquid metal bath comprising, as a percentage by weight, Cu 3.4-4.0; Mg 0.5-0.8; Mn 0.1-0.7; Fe≤0.15; Si≤0.15; Zr≤0.04; Ag 0.01-0.25; Zn<0.1; other elements ≤0.05 each and ≤0.15 in total; the Cu/Mg ratio is between 5 to 5.5; remainder aluminum;
b. casting a rolling ingot said liquid metal bath;
c. homogenizing said rolling ingot;
d. hot rolling and, optionally cold rolling said rolling ingot into a sheet having a final thickness between 0.5 and 12 mm;
e. solution heat treatment and quenching of said sheet;
f. controlled stretching of said sheet with a permanent set of 0.5 to 6%;
g. aging the stretched sheet by heating at a temperature between 130 and 180° C. for a time of 10 to 100h.

12. The thin sheet according to claim 11, wherein the rolling ingot is homogenized at a temperature between 480 and 560° C., for a time of 4 to 20h.

13. The thin sheet according to claim 11, wherein before d., the rolling ingot is heated at a temperature of 420 to 480° C. for 10 to 20h.

14. The thin sheet according to claim 11, wherein the solution heat treatment is performed at a temperature between 490 and 560° C. for 20 minutes to 2h.

15. A process for manufacturing a thin sheet which is made of an alloy based on mainly recrystallized aluminum which has a thickness of between 0.25 and 12 mm comprising successively:
a. producing a liquid metal bath comprising, as a percentage by weight, Cu 3.4-4.0; Mg 0.5-0.8; Mn 0.1-0.7; Fe≤0.15; Si≤0.15; Zr≤0.04; Ag 0.01-0.25; Zn<0.1; other elements ≤0.05 each and ≤0.15 in total; the Cu/Mg ratio is between 5 to 5.5; remainder aluminum;
b. casting a rolling ingot said liquid metal bath;
c. homogenizing said rolling ingot;
d. hot rolling and, optionally cold rolling said rolling ingot into a sheet having a final thickness between 0.5 and 12 mm;
e. solution heat treatment and quenching of said sheet;
f. controlled stretching of said sheet with a permanent set of 0.5 to 6%;
g. aging the stretched sheet by heating at a temperature between 130 and 180° C. for a time of 10 to 100h.

16. The process for manufacturing a thin sheet made of aluminum based alloy according to claim 15, wherein aging of stretched sheet is carried out by heating at a temperature between 155 and 165° C. for a time of 28 to 60h.

17. The process for manufacturing a thin sheet made of aluminum based alloy according to claim 15, wherein aging of stretched sheet is carried out by heating at a temperature between 170 and 190° C. for a time of 10 to 20h.

* * * * *